US009581319B2

(12) United States Patent
Kim et al.

(10) Patent No.: US 9,581,319 B2
(45) Date of Patent: Feb. 28, 2017

(54) LED BULB USING HEAT DISSIPATING LED DRIVER

(71) Applicant: R.F.TECH CO., LTD, Yongin-si, Gyeonggi-do (KR)

(72) Inventors: Won Kim, Yongin-si (KR); Min-Chul Kim, Seongnam-si (KR); Min-Wook Kwon, Yongin-si (KR); Jun-Young Ko, Seongnam-si (KR); Kyoung-Min Park, Seoul (KR); Jung-Hoon Kim, Seongnam-si (KR)

(73) Assignee: R.F. TECH CO., LTD, Yongin-si (KR)

( * ) Notice: Subject to any disclaimer, the term of this patent is extended or adjusted under 35 U.S.C. 154(b) by 0 days.

(21) Appl. No.: 14/767,649

(22) PCT Filed: Mar. 14, 2013

(86) PCT No.: PCT/KR2013/002038
§ 371 (c)(1),
(2) Date: Aug. 13, 2015

(87) PCT Pub. No.: WO2014/133214
PCT Pub. Date: Sep. 4, 2010

(65) Prior Publication Data
US 2015/0377471 A1 Dec. 31, 2015

(30) Foreign Application Priority Data

Feb. 27, 2013 (KR) .................. 10-2013-0021005

(51) Int. Cl.
*F21K 9/23* (2016.01)
*F21V 3/00* (2015.01)
(Continued)

(52) U.S. Cl.
CPC ............. *F21V 29/70* (2015.01); *F21K 9/23* (2016.08); *F21V 23/009* (2013.01); *F21V 29/15* (2015.01);
(Continued)

(58) Field of Classification Search
CPC ........ F21V 3/00; F21V 19/0055; F21V 23/02; F21V 29/20; F21V 29/85; F21V 29/89; F21K 9/135; F21Y 2101/02
(Continued)

(56) References Cited

U.S. PATENT DOCUMENTS

2011/0211351 A1* 9/2011 Van De Ven ............ F21K 9/17
362/249.02
2013/0033165 A1* 2/2013 Terazawa ............... F21V 29/004
313/46
(Continued)

FOREIGN PATENT DOCUMENTS

JP 2004-185993 7/2004
JP 2010-123527 6/2010
(Continued)

OTHER PUBLICATIONS

Translation of Patent JP2011198489a, LED electric bulb Hattori Norifumi Oct. 2011.*
(Continued)

*Primary Examiner* — Alexander H Taningco
*Assistant Examiner* — Renan Luque
(74) *Attorney, Agent, or Firm* — Kile Park Reed & Houtteman PLLC

(57) ABSTRACT

The present invention provides an LED bulb using heat dissipating LED driver capable of reducing heat influence by disposing an electrolytic capacitor in an output part at a low temperature region through disposing a section receiving an external power close to a light generating module and (Continued)

disposing a section controlling a light emitting diode dose to a power source base.

5 Claims, 4 Drawing Sheets

(51) Int. Cl.
| | | |
|---|---|---|
| *F21Y 101/00* | (2016.01) | |
| *F21V 29/70* | (2015.01) | |
| *F21V 29/508* | (2015.01) | |
| *F21V 23/00* | (2015.01) | |
| *H05B 33/08* | (2006.01) | |
| *F21V 29/15* | (2015.01) | |

(52) U.S. Cl.
CPC ....... *F21V 29/508* (2015.01); *H05B 33/0815* (2013.01); *F21V 3/00* (2013.01); *F21Y 2101/00* (2013.01)

(58) Field of Classification Search
USPC .................. 315/185, 112; 362/373, 294, 265
See application file for complete search history.

(56) References Cited

U.S. PATENT DOCUMENTS

| | | | | |
|---|---|---|---|---|
| 2013/0033881 A1* | 2/2013 | Terazawa | .............. | F21K 9/1375 362/382 |
| 2013/0099668 A1* | 4/2013 | Ji | ............................ | F21K 9/135 315/112 |

FOREIGN PATENT DOCUMENTS

| | | | | |
|---|---|---|---|---|
| JP | 2011-198489 | 10/2011 | | |
| JP | 2011198489 A | * 10/2011 | ................ | F21S 2/00 |
| JP | 2012-99335 | 5/2012 | | |
| JP | 2013-20907 | 1/2013 | | |

OTHER PUBLICATIONS

International Search Report for International Application No. PCT/KR2013/002038, dated Nov. 1, 2013.
Written Opinion with English Translation for International Application No. PCT/KR2013/002038, dated Nov. 1, 2013.

\* cited by examiner

LED BULB USING HEAT DISSIPATING LED DRIVER

TECHNICAL FIELD

The present invention relates to an LED bulb, more particularly to an LED bulb using heat dissipating LED driver, which is designed to be capable of dissipating heat generated by an LED module.

BACKGROUND ART

In general, a fluorescent lamp or an incandescent lamp is widely used as a room lighting, but has demerits of short life time, low luminance and low energy efficiency. Therefore, an LED lighting apparatus employing light emitting diode (LED) with relatively longer life time, higher luminance and lower power consumption as a light source is increasing.

Especially, a bulb type LED lighting apparatus capable of replacing a compact fluorescent lamp (CFL), which can be combined with a bulb socket without any additional device to be used, is actively developed.

Conventionally, the LED lighting apparatus for replacing the CFL is similar to an LED lighting apparatus for replacing incandescent lamp in design, so that the degree of design completion is not high. That is, the design that a circuit board on which LEDs are arranged is installed at a heat sink with a hemispherical shape, and a diffusion cover with a dome shape is attached, is dominating.

However, a large portion of the conventional heat sink includes an outer heat dissipating fins protruding outward to improve heat dissipation efficiency to deteriorate appearance.

On the other hand, the LED lighting apparatus includes an LED driver for driving light emitting diodes by converting alternating power provided externally into direct power that is proper to the light emitting diodes, and the shape and position of the LED driver determine the design of the product. Therefore, there exists a try changing the LED driver for improving outer design and heat dissipation efficiency.

In designing the LED driver, the LED driver requires an electrolytic capacitor. The electrolytic capacitor is sensitive to temperature, and the lifetime decreases when the temperature becomes higher. The light generating module generates most portions of heats, so that the temperature of the electrolytic capacitor becomes higher and the lifetime of the electrolytic capacitor decreases when the electrolytic capacitor is disposed near the light generating module.

Further, the parts generating heats are overlapped to further raise the temperature. That is, the light generating module generating a large portion of heats are adjacent to the electrolytic capacitor of the LED driver to raise temperature of the electrolytic capacitor, and raising temperature of the light generating module and the LED driver overlaps to further raise the temperature.

DETAILED DESCRIPTION OF THE INVENTION

Objects of the Invention

The object of the present invention is to provide an LED bulb using heat dissipating LED driver capable of increasing a lifetime of electrolytic capacitor in an LED output part through disposing the electrolytic capacitor close to a low temperature region and capable of reducing heat overlapping through spacing the LED driver apart from a high temperature region of a LED apparatus by designing of the LED driver inverse to a conventional designing.

Technical Solution

An LED bulb using a heat dissipating LED driver according to embodiment of the present invention to solve above problems, may include a light generating module comprising at least one light emitting diode on a circuit board, a heat dissipating member disposed under the light generating module, a power source base disposed under the heat dissipating module to be connected to an external lamp socket, and an LED driver converting an external power provided through the power source base into a driving power that is proper to drive the light emitting diode to control the light emitting diode. In this case, a section of the LED driver, which receives the external power, and another section of the LED drive, which controls driving of the light emitting diode, are exchanged in position.

The LED driver may include an AC input part disposed on a lower surface of the light generating module, inside of the heat dissipating member to receive the external power through the power source base, a switching part disposed under the AC input part and electrically connected to the AC input part to converts the external power into a rectified power to be provided to the light emitting diode, an LED output part disposed under the switching part, and controlling the light emitting diode by using the rectified power provided by the switching part.

The switching part may include a bridge circuit rectifying the alternating power provided through the power source base. The LED output part may include a driving IC controlling driving of the light emitting diode by using the rectified power rectified by the switching part.

The power source base may include a power source connecting part to be connected to the external lamp socket, and an insulating member disposed between the power source connecting part and the heat dissipating member to insulate the power source connecting part and the heat dissipating member.

Advantageous Effects

According to the LED bulb using the heat dissipating LED driver according to the present invention, the electrolytic capacitor that is sensitive to heats is disposed at a low temperature region by exchanging AC input and LED output in position through designing of the LED driver inverse to a conventional designing.

Additionally, the LED driver and the part of the LED apparatus, of which temperature is high, are spaced apart from each other to reduce heat overlapping so that total heat generation is reduced.

EMBODIMENTS OF THE INVENTION

The invention may have various modifications and embodiments, and the invention is described more fully hereinafter with reference to the accompanying drawings. However, the present invention should not be construed as limited to the example embodiments set forth herein, but should be understood to include all modifications, equivalents and substitutions within the scope of the idea and technics of the present invention.

It will be understood that, although the terms first, second, etc. may be used herein to describe various elements, but should not be limited by these terms. These terms are only used to distinguish one element from another element. For example, a first element could be termed as a second element and a second element could be termed as a first element without departing from the teachings of the present invention.

The terms used in the present application are only to explain the specific embodiment and is not intended to limit the present invention. The terms "a", "an" and "the" mean "one or more" unless expressly specified otherwise. The terms "including", "comprising", etc., are to designate features, numbers, processes, structural elements, parts, and combined component of the application, and should be understood that it does not exclude one or more different features, numbers, processes, structural elements, parts, combined component.

If not defined differently, all the terms used herein including technical or scientific terms, may be understood same as a person skilled in the art may understand.

The terms that are used herein are same as the terms defined in a commonly-used dictionary may be understood as same a contextual meaning, if not mentioned clearly, may not be understood as excessively or ideally.

Embodiment 1

Figure 1:
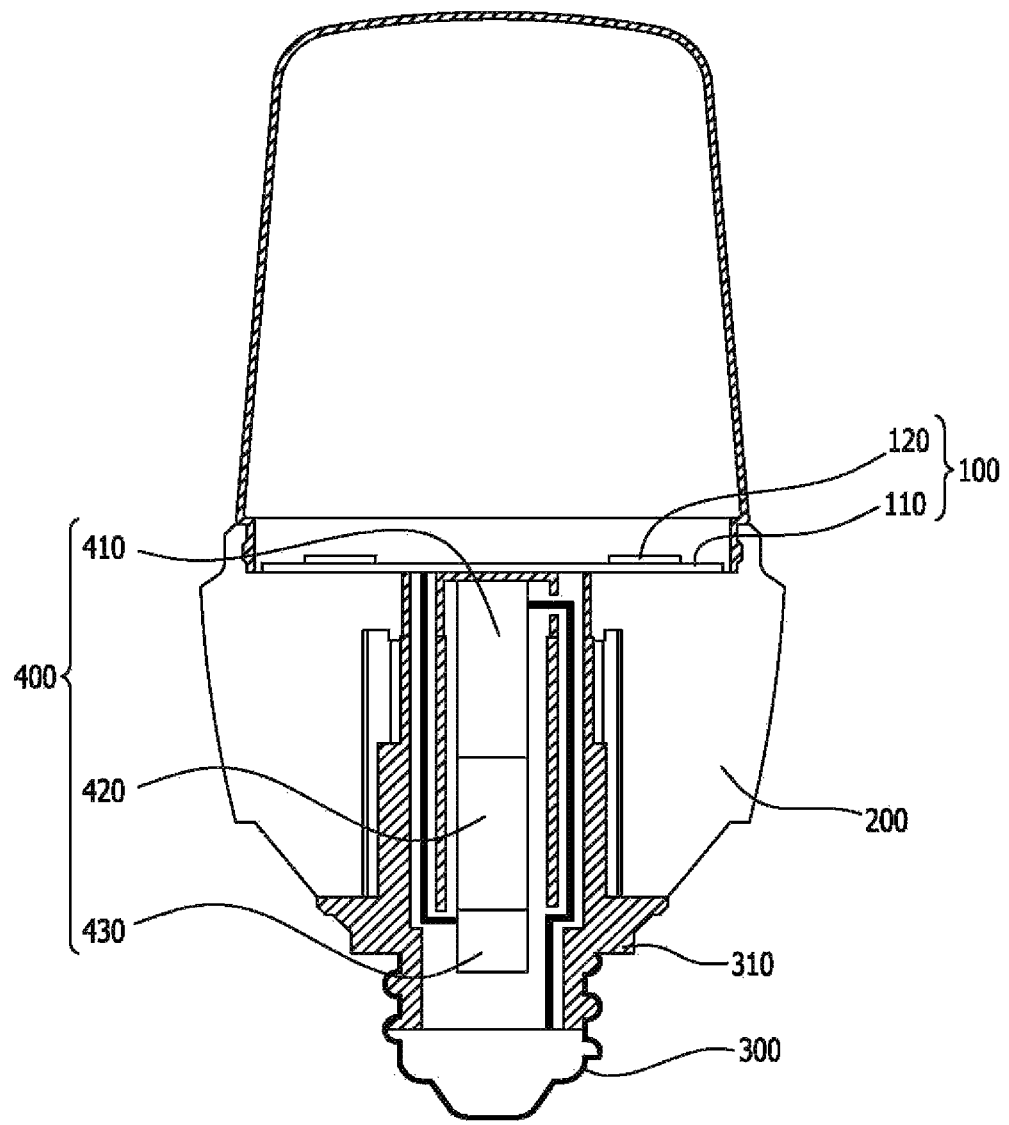
FIG. 1 is a cross-sectional view showing an LED bulb according to a first embodiment of the present invention.

FIG. 1 is a cross-sectional view showing an LED bulb according to a first embodiment of the present invention.

Referring to FIG. 1, an LED bulb according to an embodiment of the present invention may include a light generating module 100, a heat dissipating member 200, a power source base 300 and an LED driver 400.

The light generating module 100 includes at least one light emitting diode 120 formed on a circuit board 110.

The heat dissipating member 200 fixes the light generating module 100 and dissipates heats generated by the light generating module 100. The heat dissipating member 200 includes a material with high thermal conductivity to improve heat dissipating efficiency. For example, the heat dissipating member may be formed by metal such as aluminum (Al) or magnesium (Mg).

The power source base 300 is a part being electrically connected to an external lamp socket, and is connected to lower portion of the heat dissipating member. The power source base 300 may be formed in a various shape and types such as an Edison type being combined through screw connection, a bi-post type with two protruding pins, etc. The power source base 300 includes a power source connecting part and an insulating member 310 formed between the power source connecting part and the heat dissipating member to electrically insulate them. For example, the insulating member 310 may be formed by ceramic material with high electric insulation and high thermal conductivity.

The LED driver 400 converts external power (for example, alternating power of 220V or 110V) applied through the power source base 300 into a proper power (for example, a direct power), which is proper for driving of the light emitting diode 120, to control driving of the light emitting diode 120. The LED driver 400 is formed by an AC input part 410, a switching part 420 and LED output part 430 which are separated.

The AC input part 410 is electrically connected to the power source base 300 to receive an external power through the power source base 430. The AC input part 410 is installed inside of the heat dissipating member 200, and disposed on a lower surface of the light generating module 100.

The switching part 420 is electrically connected to the AC input part 410 to convert the external power into a rectified power to be provided to the light emitting diode. That is, the switching part 420 converts the external power applied through the power source base 400 into the rectified power for driving the light emitting diode 120.

For example, the switching part 420 may include a bridge circuit for rectifying the external power applied through the power source base 400. The switching part 420 is disposed under the AC input part 410.

The LED output part 430 controls the light emitting diodes by using the rectified power from the switching part 420. For example, the LED output part 430 may include a driving IC controlling the light emitting diode 120 by using the rectified power rectified by the switching part 420. The LED output part 430 is disposed under the switching part 420.

As described above, according to the LED driver 400 having the AC input part 410, the switching part 420 and the LED output part 430 separately formed with each other, the AC input part 410 is installed inside of the heat dissipating member, the switching part 420 is disposed under the AC input part 410, and the LED output part 430 is disposed under the switching part 420. In this case, the AC input part 410 is connected to the power source base 300 through a cable, and the cable includes a wire and the wire is covered by an insulating material. Further, the LED output part 430 is connected to the light generating module 100 through a cable, and the cable also includes a wire covered by an insulating material.

The arrangement described above is different from conventional arrangement. That is, in order to separate the light generating module 100 generating a large portion of heats from the LED output part 430 that is sensitive to heat as far as possible, the AC input part 410 and the LED output part 430 are disposed in different from the conventional design. The AC input part 410 that generates a small portion of heats and that is not sensitive to heat, is disposed close to the light generating module 100 that generates a large portion of heats, and the LED output part that is sensitive to heats is disposed close to the power source base 300 that generates a small portion of heats.

Through disposing as described above, the LED output part 430 that is sensitive to heats since the LED output part 430 includes the electrolytic capacitor is spaced apart from the light generating module 100 generating a large amount of heats to reduce phenomenon of heat overlapping. Therefore, the electrolytic capacitor of the LED output part 430 generates a small portion of heats due to a little influence of the heats generated by the light generating module 100, so that the lifetime of the electrolytic capacitor increases to reduce generating heats and lifetime of the total lighting apparatus.

That is, an additional member such as a heat dissipating member is not required since the heats generated by the LED driver 400 can be reduced, so that heat dissipation of the LED driver can be obtained. By using the LED driver having function of heat dissipation as described above, the amount of heats generated by the LED driver 400 is reduced so that the amount of heats to be dissipated through the heat dissipating member 200 is reduced to improve heat dissipation function of the LED bulb.

Embodiment 2

Figure 2:
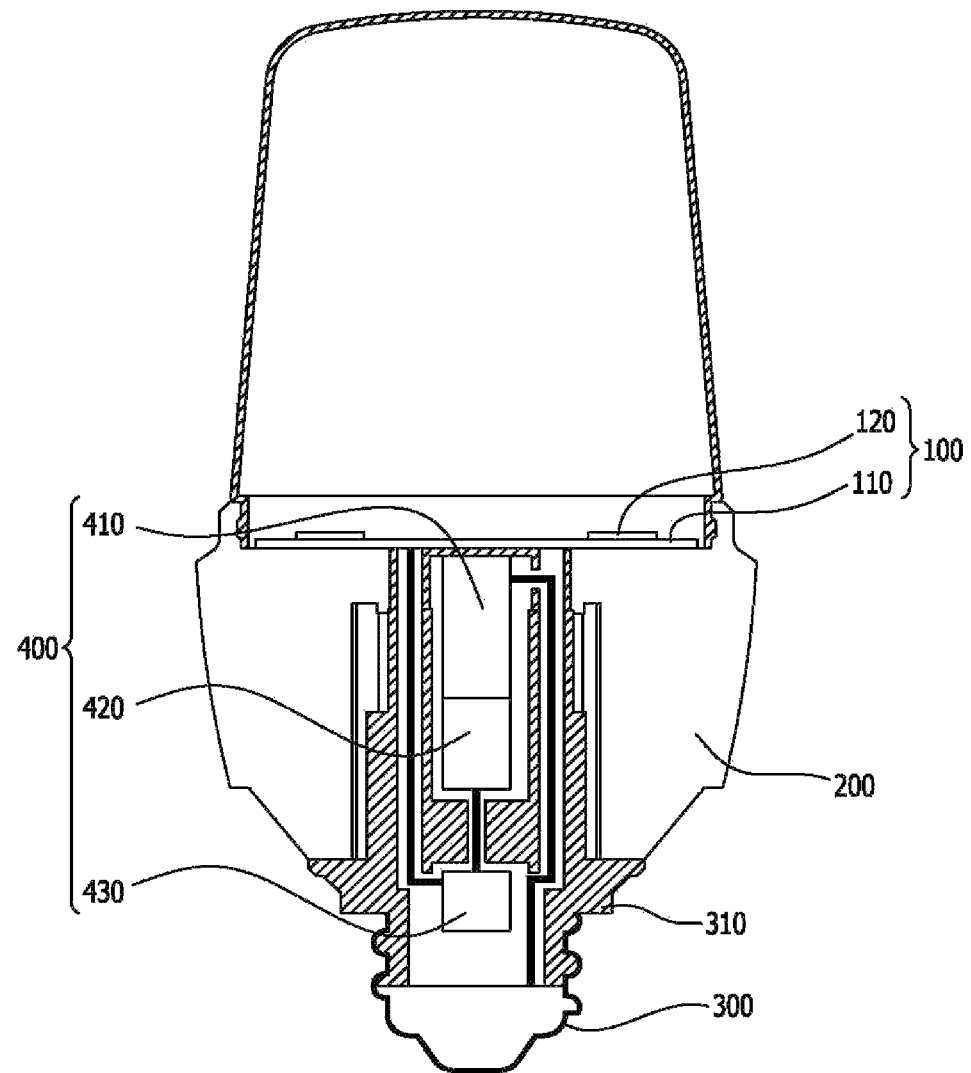
FIG. 2 is a cross-sectional view showing an LED bulb according to a second embodiment of the present invention.

FIG. 2 is a cross-sectional view showing an LED bulb according to a second embodiment of the present invention.

The LED bulb according to the second embodiment is substantially same as the LED bulb according to the first embodiment except for the connection of the LED driver and the consequential arrangement of insulating material. Thus, same reference numerals will be used for the same elements and any further explanation will be omitted.

Referring to FIG. 2, the LED bulb according to the second embodiment of the present invention may include a light generating module 100, a heat dissipating member 200, a power source base 300 and an LED driver 400.

The light generating module 100, the heat dissipating member 200 and the power source base 300 among the elements are same as those of the first embodiment, so that explanation regarding to those will be omitted.

The LED driver 400 may be divided into an AC input part 410, a switching part 420 and an LED output part 430, and converts external power (for example, alternating power of 220V or 110V) applied through the power source base 300 into a proper power (for example, a direct power), which is proper for driving of the light emitting diode 120, to control driving of the light emitting diode 120.

Both of the AC input part 410 and the switching part 420 are formed on one circuit board. The AC input part 410 is electrically connected to the power source base 300 to receive external power, and the switching part 420 converts the external power into a rectified power to be provided to light emitting diodes. The AC input part 410 and the switching part 420 are installed inside of the heat dissipating member 200 and disposed on a lower surface of the light generating module 100.

The LED output part 430 is electrically connected to the switching part 420 through a wire, and disposed close to the power source base 300. The LED output part 430 is also electrically connected to the light generating module 100 through a wire to drive the light generating module 100.

On the other hand, an insulating member is disposed between the switching part 420 and the LED output part 430, and only the wire connecting the switching part 420 and the LED output part 430 can pass through the insulating member.

As described above, both of the AC input part 410 and the switching part 420 are formed on one circuit board to be electrically connected with each other, and the LED output part 430 are formed on another circuit board to be electrically connected to the switching part 420 through a wire. The AC input part 410 and the switching part 420 are formed on one circuit board together but functions thereof are separately formed.

According to the LED driver 400 formed as described above, the AC input part 410 and the switching part 420 are formed inside of the heat dissipating member 200, and the LED output part 430 is disposed close to the power source base 300.

In this case, the AC input part 410 is connected to the power source base 300 through a cable, and the cable includes a wire and the wire is covered by an insulating material. Further, the LED output part 430 is connected to the light generating module 100 through a cable, and the cable also includes a wire covered by an insulating material.

Since the LED output part 430 is physically spaced apart from the AC input part 410 and the switching part 420 using the above described arrangement, a medium transferring the heats generated by the LED output part 430 to the AC input part 410 and the switching part 420 is reduced to effectively dissipate heats.

The arrangement described above is different from conventional arrangement. That is, in order to separate the light generating module 100 generating a large portion of heats from the LED output part 430 that is sensitive to heat as far as possible, the AC input part 410 and the LED output part 430 are disposed in different from the conventional design. The AC input part 410 that generates a small portion of heats and that is not sensitive to heat, is disposed close to the light generating module 100 that generates a large portion of heats, and the LED output part that is sensitive to heats is disposed close to the power source base 300 that generates a small portion of heats.

In the second embodiment described above, the LED output part 430 that is sensitive to heats is separately disposed and receives electric power through a wire so that transferring heats from other members to the LED output part 430 and transferring heats from the LED output part 430 to other members can be minimized. That is, the LED output part 430 that is sensitive to heats since the LED output part 430 includes the electrolytic capacitor is spaced apart from the light generating module 100 generating a large amount of heats to reduce phenomenon of heat overlapping.

Therefore, since the heats generated by the LED driver 400 is reduced and the influence of heats generated by the light generating module 100 to the LED output part 430 is minimized, the heat dissipation of the LED driver can be obtained without an additional member such as the heat dissipating member. Further, the heats generated by the LED driver are reduced to improve the performance of the heat dissipating member 200.

Embodiment 3

Figure 3:
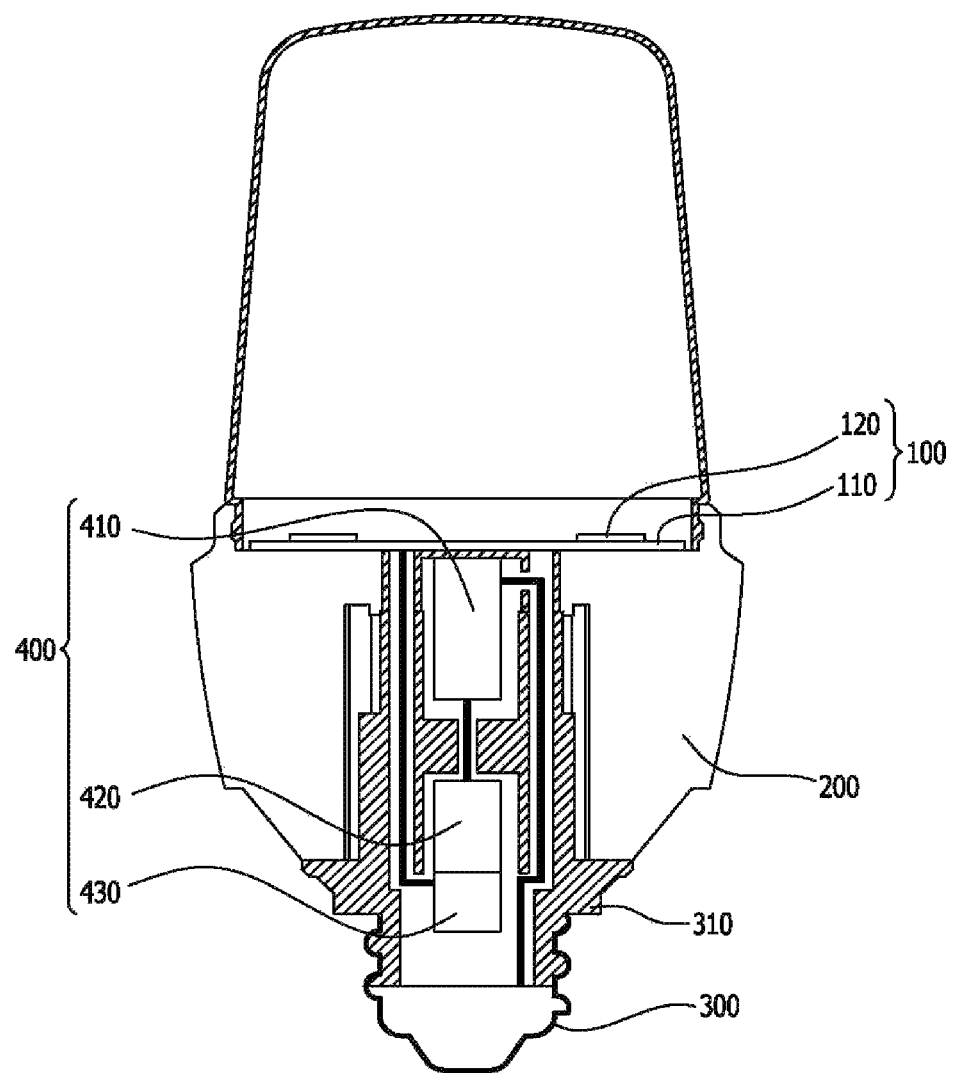
FIG. 3 is a cross-sectional view showing an LED bulb according to a third embodiment of the present invention.

FIG. 3 is a cross-sectional view showing an LED bulb according to a third embodiment of the present invention.

The LED bulb according to the third embodiment is substantially same as the LED bulb according to the first embodiment except for the connection of the LED driver and the consequential arrangement of insulating material. Thus, same reference numerals will be used for the same elements and any further explanation will be omitted.

Referring to FIG. 3, the LED bulb according to the third embodiment of the present invention may include a light generating module 100, a heat dissipating member 200, a power source base 300 and an LED driver 400.

The light generating module 100, the heat dissipating member 200 and the power source base 300 among the elements are same as those of the first embodiment, so that explanation regarding to those will be omitted.

The LED driver 400 may be divided into an AC input part 410, a switching part 420 and an LED output part 430, and converts external power (for example, alternating power of 220V or 110V) applied through the power source base 300 into a proper power (for example, a direct power), which is proper for driving of the light emitting diode 120, to control driving of the light emitting diode 120.

The AC input part 410 is electrically connected to the power source base 300 to receive an external power through the power source base 430. The AC input part 410 is installed inside of the heat dissipating member 200, and disposed on a lower surface of the light generating module 100.

Both of the switching part 420 and the LED output part 430 are formed on one circuit board. The switching part 420 is electrically connected to the AC input part 410 through a wire.

The operation and elements of the switching part 420 and the LED output part 430 are same as those of the first embodiment. Therefore, any further explanation will be omitted.

On the other hand, an insulating member is disposed between the AC input part 410 and the switching part 420, and only the wire connecting the AC input part 410 and the switching part 420 can pass through the insulating member.

As described above, the AC input part 410 and the switching part are respectively formed at circuit boards separated from each other, and connected with each other through the wire. The switching part 420 and the LED output part 430 are formed on one circuit board but functions thereof are separated from each other.

According to the LED driver 400 formed as described above, the AC input part 410 is formed inside of the heat dissipating member, and the switching part 420 and the LED output part are disposed close to the power source base 300.

In this case, the AC input part 410 is connected to the power source base 300 through a cable, and the cable includes a wire and the wire is covered by an insulating material. Further, the LED output part 430 is connected to the light generating module 100 through a cable, and the cable also includes a wire covered by an insulating material.

Through disposing as above, the heats generated by the LED output part 430 is prevented from being transferred to the AC input part 410 so that effective heat dissipation can be obtained.

The arrangement described above is different from conventional arrangement. In order that the AC input part 410 that is least sensitive to heats among elements of the LED driver 400 is disposed close to the light generating module 100, and the LED output part 430 that is sensitive to heats is disposed as far as possible from the light generating module 100, the AC input part 410 and the LED output part 430 are disposed differently from conventional design. That is, the AC input part 410 that generates a small portion of heats and that is not sensitive to heat, is disposed close to the light generating module 100 that generates a large portion of heats, and the LED output part that is sensitive to heats is disposed close to the power source base 300 that generates a small portion of heats.

In the third embodiment described above, only the AC input part 410 is disposed under the light generating module to prevent heats from being transferred to the LED output part that is sensitive to heats. That is, the LED output part 430 that is sensitive to heats since the LED output part 430 includes the electrolytic capacitor is spaced apart from the light generating module 100 generating a large amount of heats so that physical connection such as a circuit board is reduced to minimize heat transferring.

Therefore, since the heats generated by the LED driver 400 is reduced and the influence of heats generated by the light generating module 100 to the LED output part 430 is minimized, the heat dissipation of the LED driver can be obtained without an additional member such as the heat dissipating member. Further, the heats generated by the LED driver are reduced to improve the performance of the heat dissipating member 200.

Hereinafter, the structure and the function of the LED driver according to embodiments will be explained in detail, referring to a figure.

Figure 4:
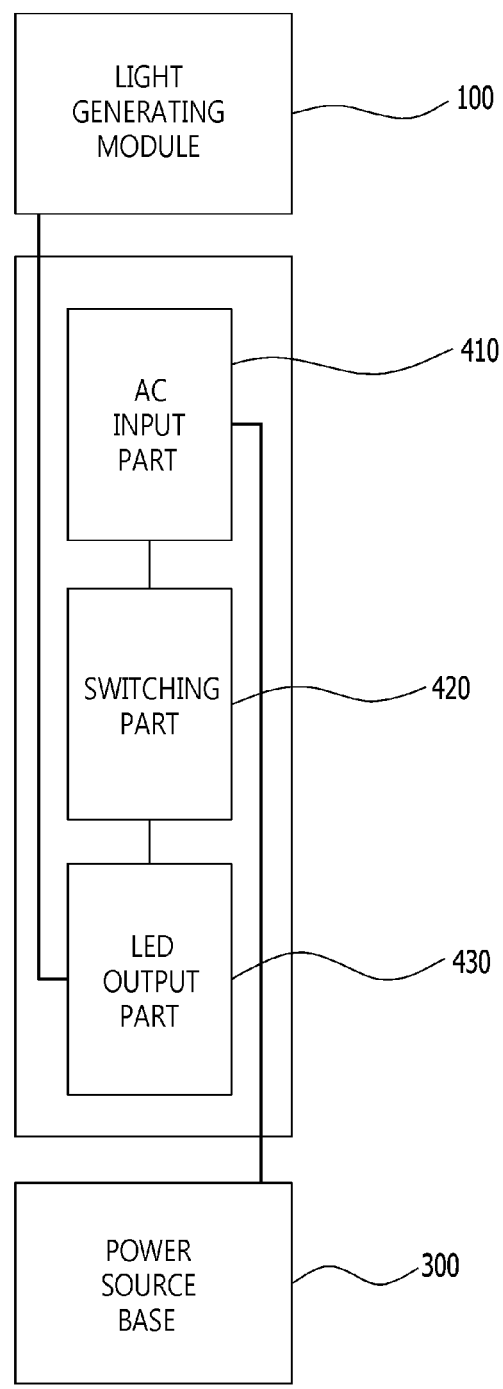
FIG. 4 is a block diagram showing an LED driver with heat dissipating function by reducing heat generation of an LED driver.

FIG. 4 is a block diagram showing an LED driver with heat dissipating function by reducing heat generation of an LED driver.

Referring to FIG. 4, the LED driver 400 is divided into the AC input part 410, the switching part 420 and the LED output part 430. The switching part 420 is disposed under the AC input part 410, and the LED output part 430 is disposed under the switching part 420. In this case, the light generating module 100 is disposed over the AC input part 410, and the power source base 300 is disposed under the LED output part 430.

In this case, the AC input part 410 and the power source base 300 are spaced apart from each other so that the AC input part 410 cannot be directly connected to the power source base 300. Therefore, the AC input part 410 and the power source base 300 are electrically connected with each other through a wire. The wire is covered by an insulating material to be a cable to reduce influence of current flowing through the wire to the LED driver 400.

Additionally, the LED output part 430 and the light generating module 100 are spaced apart so that the LED output part 430 is electrically connected to the light generating module 100 through a wire to transfer a control signal to the light generating module 100. In this case, the wire is also covered by an insulating material to be a cable to reduce influence of driving power flowing through the wire to the LED driver 400. As another example, a passage from the power source base 300 to the AC input part 410, which has a pipe shape and is shielded by an insulating material, is formed inside of the heat dissipating member 200, and the wires may pass through the passage for electric connection. Additionally, the connection between the light generating module 100 and the LED output part 430 may be performed through a passage with a pipe shape, which is shielded by an insulating material and formed inside of the heat dissipating member 200, likewise the connection between the power source base 300 and the AC input part 410.

Unlike the conventional design of a LED driver, the AC input part 410 and the LED output part are disposed inverse so that the electrolytic capacitor that is sensitive to heats is spaced apart from the light generating module 100 to increase lifetime of the LED driver 400.

Further, through the design of the LED driver, the elements in the LED bulb, which generate heats, are divided to reduce heat overlapping phenomenon, which is induced by overlapping of the elements generating a large amount of heat to raise the temperature of the elements higher.

Hereinafter, embodiments of driving and a consequent effect will be described.

Referring to FIG. 1 through FIG. 4, when an alternating power is provided through the power source base 300, the alternating power is provided to the AC input part 410 through the wire. In this case, the AC input part 410 is disposed under the light generating module 100, and the insulating member 310 is disposed between the AC input part 410 and the light generating module 100 so that the alternating power provided to the AC input part 410 does not influence the light generating module 100. The alternating power provided to the AC input part is rectified by the switching part 420 to be direct power. The direct power generated by the switching part 420 is provided to the LED output part 430 to drive the LED chips of the light generating module 100. As described above, while the light generating module 100 is driven, the LED output part 430 and the light generating module generate heats.

In case of a conventional LED bulb, the light generating module and the LED output part are directly connected to generate more heats. That is, the heat generated by the light generating module influences the LED output part to raise the temperature of the LED output part, so that the temperature of the LED output pat becomes higher than a natural driving temperature thereof due to the light generating module.

Therefore, according to the present invention, the light generating module 100 generating largest amount of heats in the LED bulb, and the LED output part 430 generating largest amount of heats in the LED driver are connected through a wire and spaced apart as far as possible in the bulb to reduce thermal influence thereof, so that the LED driver can have heat dissipating effect.

Additionally, the present invention can be applied to the conventional design of the LED driver without changing the design through only changing arrangement and connecting them through a wire. Further, a conventional LED driver can be modified through wiring.

In the specifications, the present invention is explained referring to the preferred embodiments, but the embodiments are only examples and the present invention is not limited to that. The present invention may be variously modified and applied. For example, each element in the embodiment may be modified, and the modification of claimed invention should be included in the present invention.

What is claimed is:

1. A Light Emitting Diode (LED) bulb including a heat dissipating LED driver, the LED bulb comprising:
   a light generating module comprising at least one light emitting diode on a circuit board;
   a heat dissipating member disposed under the light generating module;
   a power source base disposed under the heat dissipating module to be connected to an external lamp socket; and
   an LED driver converting an external power provided through the power source base into a driving power that is proper to drive the light emitting diode to control the light emitting diode,
   wherein a section of the LED driver, which receives the external power, is disposed adjacent to the light generating module, and another section of the LED driver, which controls driving of the light emitting diode, is disposed adjacent to the power source base,
   wherein the LED driver comprises:
   circuitry configured to
      receive the external power through the power source base via an AC input part disposed on a lower surface of the light generating module, wherein the AC input part is directly connected to a first wire to electrically connect the AC input part to the power source base;
      rectify an alternating power provided through the power source base to convert the external power into a rectified power to be provided to the light emitting diode via a switching part comprising a bridge circuit disposed under the AC input part, and electrically connected to the AC input; and
      control the light emitting diode based on the rectified power provided by the switching part via an LED output part disposed under the switching part, wherein the LED output part is electrically connected to the switching part through a second wire, and
   wherein an insulating member is disposed between the AC input part and the LED output part, and
   wherein the insulating member is configured such that only the second wire connecting the switching part and the LED output part can pass through the insulating member.

2. The LED bulb including a heat dissipating LED driver of claim 1, wherein the AC input part is disposed inside of the heat dissipating member.

3. The LED bulb including a heat dissipating LED driver of claim 1, wherein the LED output part comprises a driving IC controlling driving of the light emitting diode by receiving the rectified power rectified by the switching part.

4. The LED bulb including a heat dissipating LED driver of claim 1, wherein the power source base comprises:
   a power source connecting part to be connected to the external lamp socket; and
   an insulating member disposed between the power source connecting part and the heat dissipating member to insulate the power source connecting part and the heat dissipating member.

5. The LED bulb including a heat dissipating LED driver of claim 1, wherein the AC input part is formed on a first circuit board and the LED output part is formed on a second circuit board.

* * * * *